(12) United States Patent
Pech et al.

(10) Patent No.: US 10,587,468 B2
(45) Date of Patent: Mar. 10, 2020

(54) SYSTEM AND METHOD OF A GRACEFUL REBOOT OF A NETWORK CONTROLLER

(71) Applicant: Arista Networks, Inc., Santa Clara, CA (US)

(72) Inventors: Andre Pech, San Francisco, CA (US); Gagandeep Singh Arneja, San Francisco, CA (US); Chandrashekhar Appanna, Saratoga, CA (US); Aparna Sushrut Karanjkar, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 14/697,539

(22) Filed: Apr. 27, 2015

(65) Prior Publication Data

US 2016/0315813 A1 Oct. 27, 2016

(51) Int. Cl.
*G06F 15/177* (2006.01)
*H04L 12/24* (2006.01)

(52) U.S. Cl.
CPC .............. *H04L 41/0816* (2013.01)

(58) Field of Classification Search
CPC .................................................. H04L 41/0816
USPC ....................................................... 709/221
See application file for complete search history.

(56) References Cited

U.S. PATENT DOCUMENTS

| | | |
|---|---|---|
| 2004/0131079 A1 | 7/2004 | Hedge et al. |
| 2006/0041658 A1 | 2/2006 | Nelson et al. |
| 2007/0162591 A1 | 1/2007 | Mo et al. |
| 2009/0052445 A1 | 2/2009 | Folkes |
| 2009/0086622 A1* | 4/2009 | Ng .......................... H04L 45/02 370/219 |
| 2010/0114831 A1* | 5/2010 | Gilbert .................... G06F 16/27 707/648 |

(Continued)

FOREIGN PATENT DOCUMENTS

EP 2765758 A1 8/2014

OTHER PUBLICATIONS

PCT Chapter I International Preliminary Report on Patentability (IPRP Chapter I) PCT/US2016/028160 dated Jan. 13, 2017. (11 pages).

(Continued)

*Primary Examiner* — Atta Khan
(74) *Attorney, Agent, or Firm* — Haley Guiliano LLP

(57) ABSTRACT

A method and apparatus to bring up a network controller in a network of multiple network elements is described. In an exemplary embodiment, the network controller receives an indication that the network controller is booting up. The network controller is coupled to a plurality of network elements in a network, where the network controller maintains a controller database that supports a network-wide service used by the plurality of network elements. The network controller further receives state information from the plurality of network elements. In addition, the network controller builds the controller database from the state information. Furthermore, the network controller sends updates from the controller database to each of the plurality of network elements, where each of the plurality of network elements incorporates these updates into a respective network element database and the network element database is used to perform the network-wide service.

14 Claims, 9 Drawing Sheets

(56) References Cited

U.S. PATENT DOCUMENTS

| | | | |
|---|---|---|---|
| 2012/0210162 A1* | 8/2012 | Gara | G06F 11/1064 714/6.1 |
| 2012/0275456 A1* | 11/2012 | Ammireddy | H04L 45/02 370/390 |
| 2014/0047425 A1 | 2/2014 | Thapar et al. | |
| 2014/0146661 A1* | 5/2014 | Lu | H04L 45/021 370/219 |
| 2014/0149782 A1* | 5/2014 | Lu | H04L 45/021 714/4.2 |
| 2015/0009835 A1* | 1/2015 | Koponen | H04L 41/0873 370/242 |
| 2015/0100704 A1* | 4/2015 | Davie | H04L 45/16 709/238 |
| 2016/0057052 A1* | 2/2016 | Zhang | H04L 45/28 709/239 |
| 2016/0065454 A1* | 3/2016 | Arumugam | H04L 45/38 370/389 |

OTHER PUBLICATIONS

"HyperFlow: A Distributed Control Plane for OpenFlow", Amin Tootoonchian University of Toronto Amingammas Toronto Edu, Usenix Apr. 7, 2010* pp. 1-6. * date taken from the ESR in counterpart application.

* cited by examiner

SYSTEM AND METHOD OF A GRACEFUL REBOOT OF A NETWORK CONTROLLER

FIELD OF INVENTION

This invention relates generally to data networking, and more particularly, to perform a graceful reboot of a network controller that supports network-wide services for multiple network elements in a network.

BACKGROUND OF THE INVENTION

The network controller is a device that is used to support network-wide services for a network that includes multiple network elements. A network-wide service is a service that is used by two or more network elements. For example, the network-wide service can be a service that gathers known Media Access Control (MAC) addresses and assembles these addresses into a global MAC address database. This global MAC address database can be used to support a VxLAN controller service.

To support these network-wide services, the network controller receives and stores state information from these network elements. The state information is information that each network element gathers or has configured, such as forwarding information, security information, or other information that is configured on the network element or the network element gathers while running. The network controller further makes this state information available to the services running on the network controller. The services access the state information to build information to support the corresponding service. Each of the services stores this information in a non-persistent network controller database stored on the network controller. Information on the network controller database is pushed out to the network elements, where each network element stores this information in a local network element database.

A problem occurs when the network controller reboots and loses the network controller database because each of the network elements will periodically synchronize the corresponding network element database with the network controller database. If a network element attempts to synchronize its database within an empty network controller database, the network element will empty its own database. This empty network element database can cause network disruptions, because the state information stored in the network element database will no longer be there.

SUMMARY OF THE DESCRIPTION

A method and apparatus to bring up a network controller in a network of multiple network elements is described. In an exemplary embodiment, the network controller receives an indication that the network controller is booting up. The network controller is coupled to a plurality of network elements in a network, where the network controller maintains a controller database that supports a network-wide service used by the plurality of network elements. The network controller further receives state information from the plurality of network elements. In addition the network controller builds the controller database from the state information. Furthermore, the network controller sends updates from the controller database to each of the plurality of network elements, where each of the plurality of network elements incorporates these updates into a respective network element database and the network element database is used to perform the network-wide service.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
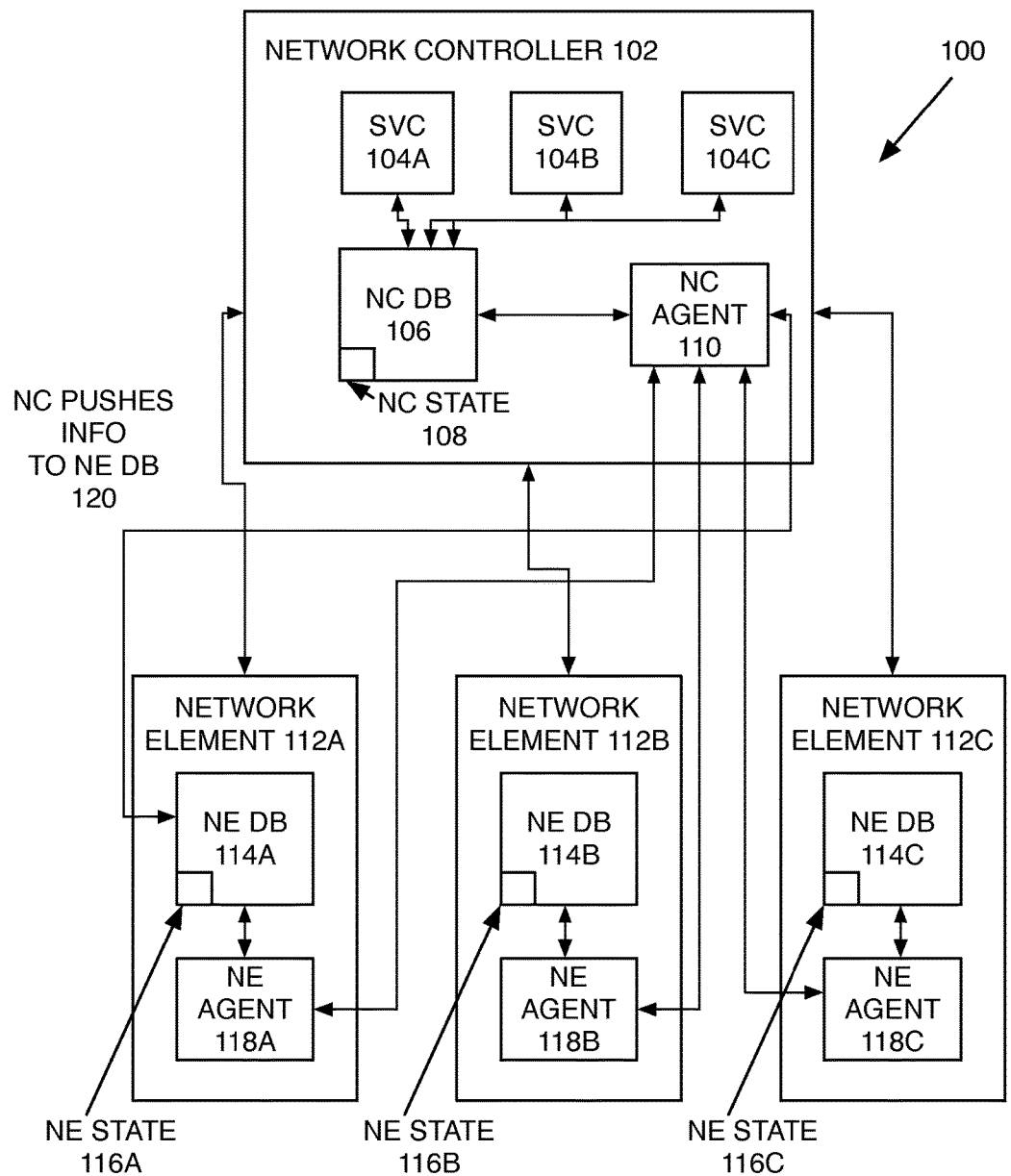
FIG. 1 is a block diagram of one embodiment of a system including a network controller that supports network-wide services for a group of network elements.

A method and apparatus to bring up a network controller in a network of multiple network elements is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus to bring up a network controller in a network of multiple network elements is described. In one embodiment, a network controller is used to support network-wide services for multiple network elements coupled together in a network. A network-wide service is a service that is used by two or more network elements. For example, the network-wide service can be a service that gathers known Media Access Control (MAC) addresses and assembles these addresses into a global MAC address database. This global MAC address database can be used to support a VxLAN controller service.

The network controller stores state and service information in a non-persistent database to support the network-wide services. Upon a reboot of the network controller, the network controller loses the network controller database because this database is not persistent. Instead of allowing the network elements to synchronize the network element database with the empty network controller database, the network controller signals to the network elements that the network controller is rebooting and requests that the network elements send the network element state information to the network controller. The network controller receives this network element state information and stores this information in the network controller database. The network controller further signals to the running services on the network controller that the running services are to rebuild the service information using the state information stored in the network controller database. The services rebuild the service information and signal to the network controller that the service and information is available to use.

With the rebuilt service information in the network controller database, the network controller can send updates to the network elements. In one embodiment, the network controller waits until a service has rebuilt the service information to give a converged database before sending updates from the network controller database to the network element database. In another embodiment, the network controller can send updates before the database is converged or before the services complete the rebuilding process of the service information. In this embodiment, the network controller sends updates as each service is rebuilding the service information. For example and in one embodiment, the network controller sends updates that are additions and deletions to the network element database prior to the services information rebuilding completing. In this example, the network element receiving these early updates would process the database additions and defer processing of the database deletions. Upon the services completing the service information rebuild process, the network controller signals to the network elements to complete the processing of the database deletions.

FIG. 1 is a block diagram of one embodiment of a system 100 including a network controller that supports network-wide services for a group of network elements. In FIG. 1, the system 100 includes a network controller 102 that is coupled to network elements 112A-C. In one embodiment, the network controller 102 is a device that receives state information from the running network elements 112A-C in the network and uses the state information to store a network controller database 106. The network elements 112A-C can each be a device that provides network access to a network (e.g., physical network, virtualized network, etc.). A network element can be a switch, router, hub, bridge, gateway, etc., or any type of device that can provide access to a network. In a further embodiment, the network element 112A-C can be a device that communicates with a network (e.g., server, personal computer, or another device that can communicate with a network). In one embodiment, one or more of the network elements 112A-C can be a physical or virtual device.

In one embodiment, the network controller 102 builds and maintains the network controller database 106 in conjunction with services 104A-C. In one embodiment, the network controller 102 can be a server, computer, switch, network element, or another type of device that can store data in a database and communicate data with a network. The network controller 102 can be of physical or virtual device. In one embodiment, if the network controller 102 is a physical device, the network controller 102 can store the network controller database in memory.

In one embodiment, the network controller database 106 is a database used to store the state information from each of the network elements 112A-C and to store data that is used by services 104A-C that provide network-wide services. In one embodiment, the network controller database 106 is a non-persistent database that is stored in memory and is lost upon reboot. For example and in one embodiment, the network controller database 106 can store media access control (MAC) addresses that are gathered by each of the network elements 112A-C. in addition, the network controller database 106 can store routes, topology information, port virtual local area network (VLAN) bindings, counter, inventory of physical ports on each network element 112A-C, or other types of network state information that is gathered by the network elements 112A-C during the operation of these network elements.

Services 104A-C use the information stored in the network controller database 106 to provide network-wide services for the network elements 112A-C in the network. In one embodiment, a network-wide service is a service utilizing the gathered network controller state information 108 and is used by two or more network elements 112A-C. In one embodiment, a service 104A-C can be a global MAC address service that provides relevant MAC addresses for different network elements 114A-C. In another embodiment, a server can be a Virtual eXtended Local Area Network (VxLAN) controller service that provides VxLAN information for the network elements that participate in a particular VxLAN (e.g., MAC address, VTEP information, or other VxLAN information).

In one embodiment, a network controller agent 110 receives state information from the network elements 112A-C via a corresponding network element agent 118A-C. In this embodiment, the network element agent 118A-C retrieves the state information for that network elements from the network element state 116A-C stored in the network element database 114A-C. The network controller agent 110 stores this received state information in the network controller state 108 component of the network controller database 106. In addition the network controller agent 110 pushes updates of the network controller database 106 to the network element database 114A-C via the corresponding network element agent 118A-C.

In one embodiment, if the network controller 102 reboots, the network controller database 106 becomes empty as this database 106 is a non-persistent database. In this embodiment, the network elements 112A-C continue to operate using the information stored in the network element database 114A-C while the network controller 102 reboots. Thus, on a reboot of the network controller 102, the network controller database 106 will need to be rebuilt after the network controller 102 boots up. A problem occurs in this situation because each of the network elements 112A-C will periodically synchronize the corresponding network element database 114A-C with the network controller database 106. If a network element 112A-C attempts to synchronize its database within an empty network controller database 106, the network element 114A-C will empty its own database. This empty network element database 114A-C can cause network disruptions, because the state information stored in the database will no longer be there. For example in one embodiment, if the network element 112A-C stores routes in its network element database 114A-C that this network element uses to make routing decisions, emptying this database will cause this network element to make incorrect routing decisions or simply drop the traffic. The network element 112A-C can rebuild the state in the network element database 114 A-C, but this rebuilding can take a long time.

In order to alleviate this problem, and in one embodiment, the network controller 102 can rebuild the network controller database 106 before the network elements 112A-C are allowed to synchronize their respective databases. In one embodiment, as the network controller 102 boots up, the network controller 102 receives the state information from each of the network elements 112A-C. The network controller 102 adds this received state information into the network controller database 106 in the network controller state 108 component. With this state information, the network controller 102 signals each of the services 104A-C to start building the corresponding piece of the network controller database 106. In this embodiment, each service 104A-C retrieves relevant state information from the network controller state information 108 and builds global information that is used to support the network-wide service for this service 104A-C. For example in one embodiment, if service 104A is a service that builds and maintains a global MAC address table for the network elements 112A-C, service 104A retrieves the MAC addresses from the network controller state information 108, builds the global MAC address table, and stores this global MAC address table in the network controller database 106. With this table built, the network controller 102 can push this information in the global MAC address table to the network elements 112A-C that subscribe to this table.

In one embodiment, the network controller 102 pushes this information from the rebuilt network controller database 106 in the form of updates to the network elements 112A-C that subscribe to this information. In this embodiment, by pushing the updates to the network elements that subscribe to the information, the network controller 102 does not have to push these updates to each and every network element in the network. In one embodiment, the network controller 102 pushes out the updates after the network controller database 106 has converged with the services 104A-C running on the network controller 102. In this embodiment, a converged database 106 for a network-wide service occurs when the network-wide service has built the data for storage in the network controller database 106 and this service is ready to send updates to the subscribing network elements 112A-C. In another embodiment, the network controller 102 pushes the updates to the network elements 112A-C before the network controller database 106 converges. In this embodiment, the updates include additions and deletions to each of the network element databases 114A-C and the network controller 102 pushes these updates as these updates become available. The network elements 112A-C processes the additions to the database and defers processing of the deletions until the network controller database has converged.

Figure 2:
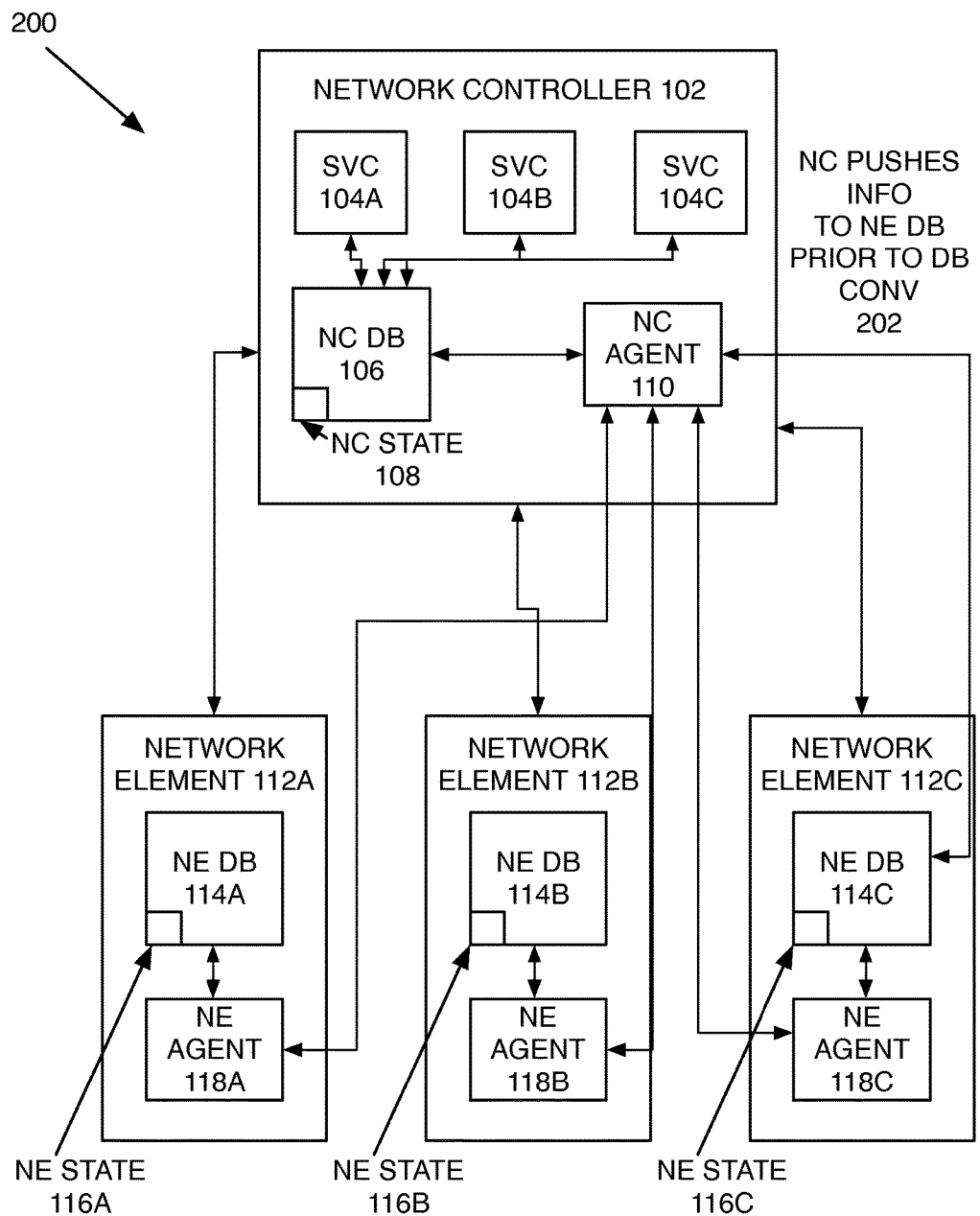
FIG. 2 is a block diagram of one embodiment of a system including a network controller that supports network-wide services for a group of network elements, where the network-wide database is pushed to the network element prior to the network-wide database converging.

FIG. 2 is a block diagram of one embodiment of a system including a network controller 102 that supports network-wide services for a group of network elements 112A-C, where the network-wide database updates are pushed to the network element prior to the network controller database 106 converging. In FIG. 2, system 200 includes a network controller 102 that is coupled to network elements 112A-C as described in FIG. 1 above. The network controller 102 includes a network controller database 106, network controller agent 110, and services 104B-C. In one embodiment, the network controller database 106, network controller agent 110, and services 104A-C are described further in FIG. 1 above. Each of the network elements 112A-C include a network element database 114A-C in the network agent 118A-C, where the network agent 118A-C sends network element state information 116A-C and receives updates from the network controller agent 110 as described in FIG. 1 above. In addition, and in one embodiment, the network controller 102 includes network controller agent 110 that pushes information to the network element database 114A prior to the database convergence 202 of the network controller database 106. In one embodiment, the network controller 102 pushes updates that can be either additions or deletions to the network element database 114A-C. In this embodiment, if the update is in addition, the network controller 102 signals to the network element 114A-C to proceed with processing these additions before the network controller database 106 converges. If the update is in addition, the network controller 102 signals to the network element 114A-C to defer processing these deletions before the network controller database 106 converges. Processing of the updates is further described in FIGS. 4 and 5 below. In one embodiment, the network element agent 118A-C performs the processing of the additions or the deferral of the deletions.

Figure 3:
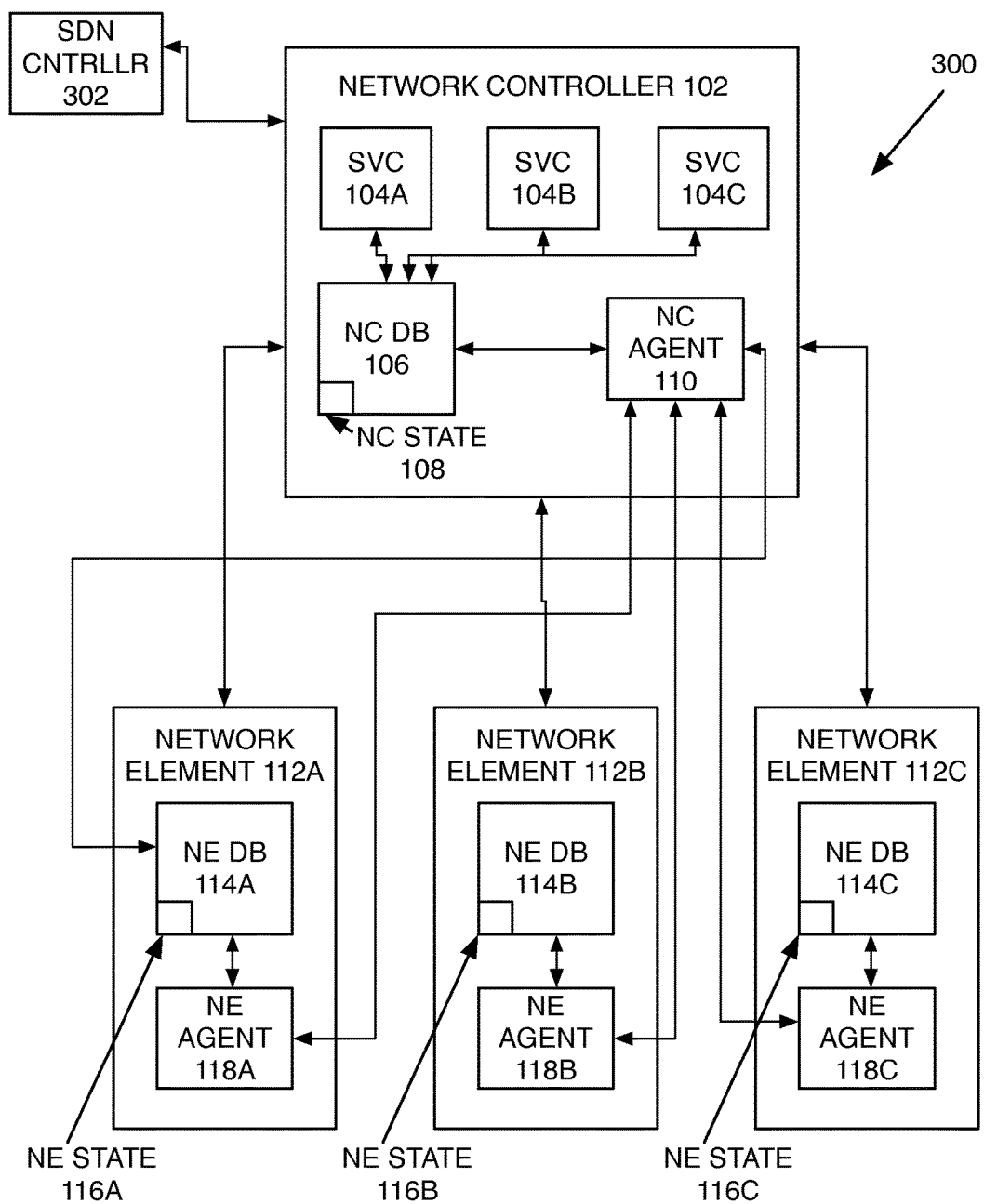
FIG. 3 is a block diagram of one embodiment of a system including a network controller that supports network-wide services for a group of network elements with a third-party software-defined network controller.

FIG. 3 is a block diagram of one embodiment of a system including a network controller 102 that supports network-wide services for a group of network elements 112A-C with a third-party software-defined network controller 302. In FIG. 3, system 200 includes a network controller 102 that is coupled to network elements 112A-C as described in FIG. 1 above. The network controller 102 includes a network controller database 106, a network controller agent 110, and services 104A-C. In one embodiment, the network controller database 106, network controller agent 110, and services 104B-C are described further in FIG. 1 above. Each of the network elements 112A-C include a network element database 114A-C in the network agent 118A-C, where the network agent 118A-C sends network element state information 116A-C and receives updates from the network controller agent 110 as described in FIG. 1 above. In addition, and in one embodiment, the network controller 102 is further coupled to a Software Defined Network (SDN) controller 302. In one embodiment, the SDN Controller 302 is a logically centralized entity that translates the network application requirements from a SDN application layer down to the SDN datapaths and provides the SDN Applications with an abstract view of the network. In one embodiment, the SDN controller 302 is a third-party controller (e.g., Open stack, NSX, VMware, Nuage, or another type of SDN controller). In this embodiment, the SDN controller 302 accesses the network controller database 106 through an application programming interface (API). In this embodiment, where the network controller 102 is coupled to an SDN controller 302, the network controller 102 waits for the network controller database 106 to converge before pushing updates to the network elements 112 A-C. Furthermore, after the network controller database 106 converges, the network controller 102 signals to the SDN controller 302 that the network database 106 is available to be used. The SDN controller 302 accesses the network controller database 106, so as to restart or continue the services offered by the SDN controller 302. The network controller 102 additionally pushes updates to the network elements 112A-C as described above in FIGS. 1 and 2.

Figure 4:
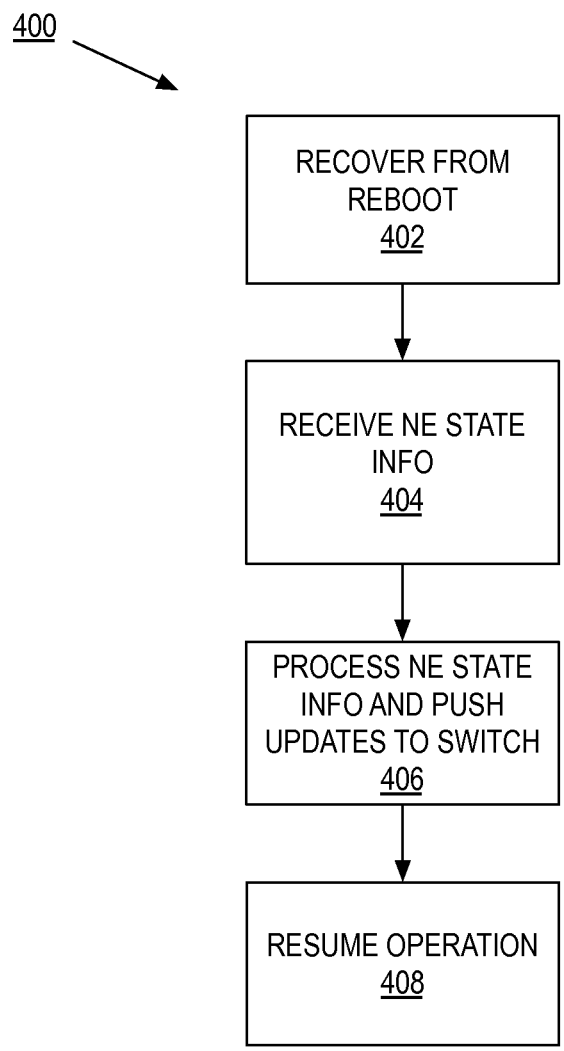
FIG. 4 is a flow diagram of one embodiment of a process to perform a graceful reboot of a network controller.

FIG. 4 is a flow diagram of one embodiment of a process 400 to perform a graceful reboot of a network controller. In FIG. 4, process 400 begins by receiving an indication that the network controller is booting up at block 402. In one embodiment, process 400 receives this indication because the network controller has rebooted. For example and in one embodiment, the network controller may reboot due to a software maintenance, power failure, hardware component failure, a software bug, and/or another event that causes the network controller to reboot. In one embodiment, because the network controller reboots, the non-persistent network controller database is deleted from the network controller memory. In this embodiment, process 400 will need to rebuild the network controller database, so that services running on the network controller can use the data stored in the network controller database.

At block 404, process 400 receives the network element state information from the network elements running in the network that the network controller is coupled to. In one embodiment, the network element state information is information gathered by or configured on each of these network elements. For example and in one embodiment, the network element state information can include learned MAC addresses, learned or configured forwarding information, security information, traffic shaping information, and/or other information that contributes to the running state of the network element.

Process 400 processes the received network element state information at block 406. In one embodiment, process 400 processes this received network element's state information by storing this state information in the network controller state component of the network controller database as described in FIG. 1 above. In another embodiment, process 400 signals to the services running on the network controller, that the network element state information is available for the services to use. In response, each of the services retrieves the relevant network element state information, so that this service can store information that is used to support the service in the network controller database. For example and in one embodiment, a global MAC address service would retrieve learned MAC addresses from the network element state information and assemble the global MAC address that is stored in the network controller database.

In a further embodiment, process 400 additionally pushes out updates to the network controller database at block 406. In one embodiment, process 400 waits until the network controller database has converged before pushing out the updates to each of the network elements. In this embodiment, a converged database is a database where each of the services that uses the database have completed storing the information that that service will use. In another embodiment, process 400 pushes out updates to the network elements concurrently with the updating of the network controller database by the services running on the network controller. Concurrently means that some or all of the pushing update operation overlap in time with the some or all of the information rebuilding operations. In this embodiment, as one or more services stores updates to the network controller database, process 400 pushes these updates out to one or more of the network elements. By concurrently pushing updates to network elements with the updating of the network controller database, process 400 reduces the amount of time that it takes for the services to converge the network controller database and to update the network elements. For example and in one embodiment, the service that builds global MAC address table can send out updates to new MAC addresses learned by the network elements prior to the network controller database converging. In this example, by sending out the updates for the learned MAC address, the network elements can potentially learn any new additions to their local database before full convergence happens at the network controller, which might take a much longer time.

At block 408, process 400 indicates to the network controller that the network controller can resume normal operations and the boot up process for the network controller is complete. In one embodiment, process 400 indicates that normal operation can be resumed by indicating that the network controller database has converged.

Figure 5:
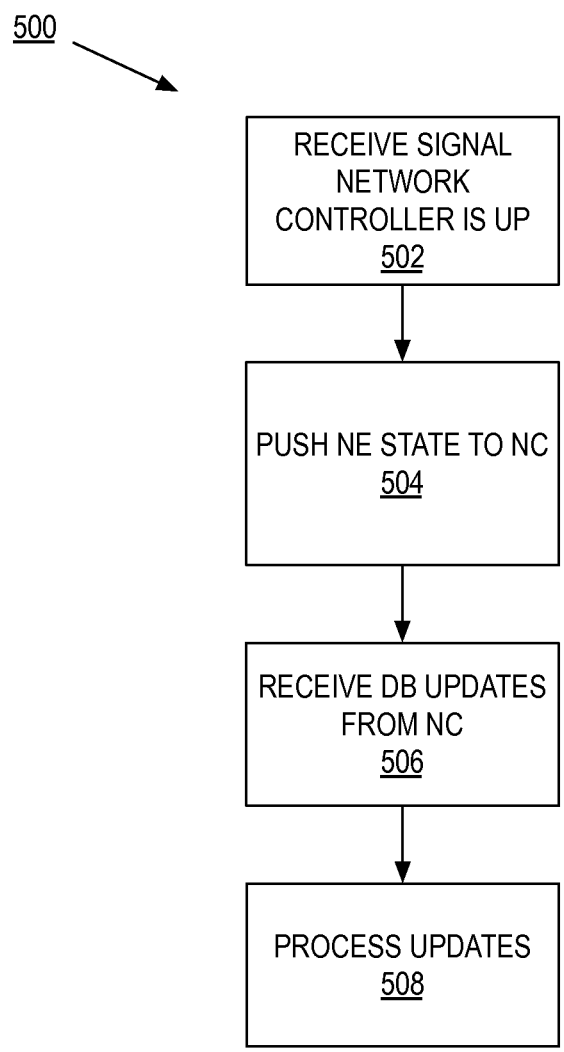
FIG. 5 is a flow diagram of one embodiment of a process to synchronize a network element database after a network controller reboot.

While process 400 is performing the boot up process of the network controller, the network elements are continuing to operate normally, send state information to the network controller, and receive updates from the network controller. FIG. 5 is a flow diagram of one embodiment of a process 500 to synchronize a network element database after a network controller reboot. In FIG. 5, process 500 begins by receiving a signal that the network controller is back up at block 502. At block 504, process 500 pushes the network element state information to the network controller. As described above, the network element state information is information about the running state of the network element. Process 500 receives updates from the network controller for the network element database at block 506. In one embodiment, these updates can be received by process 500 after the network controller database has converged, or while the services running on the network controller are updating the network controller database. At block 508, process 500 processes these updates. In one embodiment, process 500 incorporates the updates into the database on the network element. Processing the updates is further described in FIG. 6 below.

Figure 6:
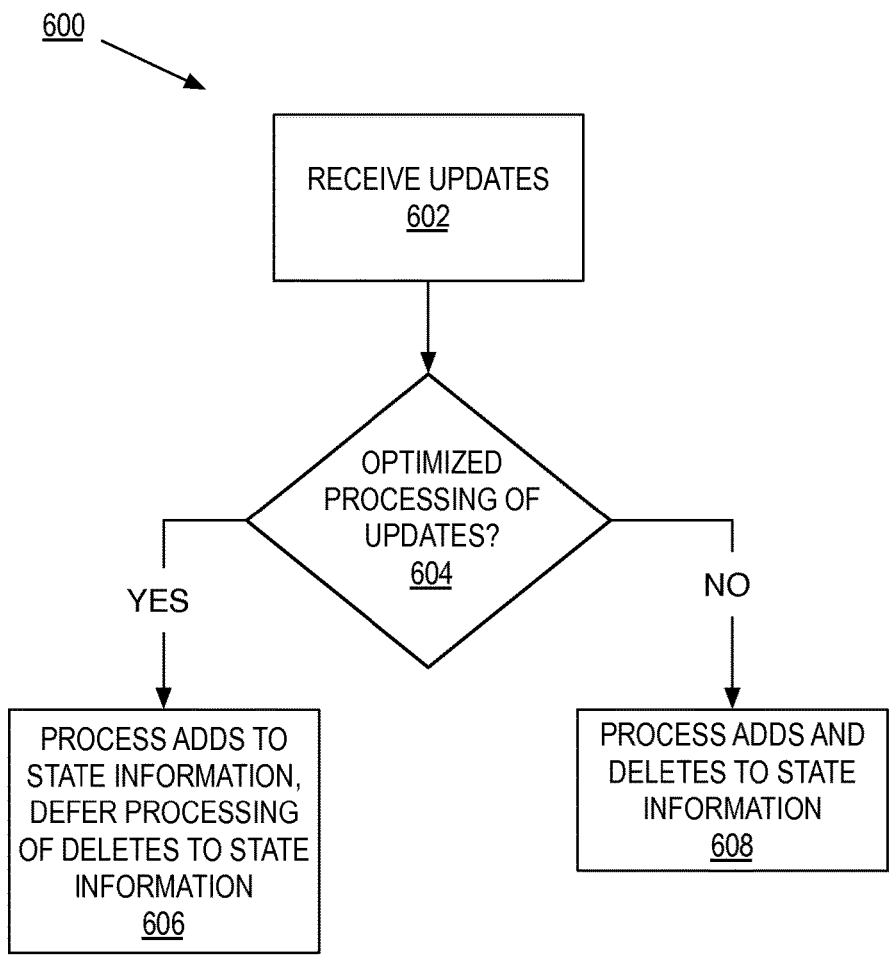
FIG. 6 is a flow diagram of one embodiment of a process to process state information pushed to a network element.

FIG. 6 is a flow diagram of one embodiment of a process 600 to process state information pushed to a network element. In FIG. 6, process 600 begins by receiving the updates at block 602. In one embodiment, the updates can be an addition to the network element database or a deletion to the network element database. At block 604, process 600 determines if process 600 should perform the optimized processing of received updates. If process 600 is to perform and optimize processing of the received updates, process 600 processes the additions to the network element database at block 606. In one embodiment, process 600 processes the additions to network element database while deferring processing of the deletes to the network, database. For example and in one embodiment, if process 600 receives an addition of a route and a deletion of a MAC address for the network element database, process 600 adds the new route to the network element database and defer the deletion of that MAC address from the network element database. If process 600 is not performing an optimized processing of the updates, at block 608, process 600 processes the update additions and deletions normally (e.g., without deferring processing of either update). In one embodiment, the normal processing is performed after the network controller database has converged.

Figure 7:
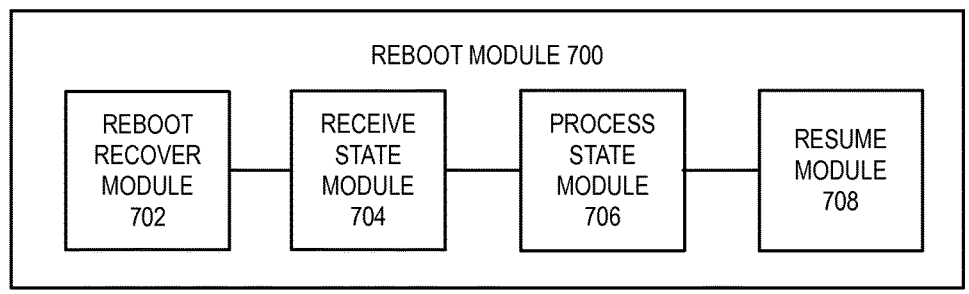
FIG. 7 is a block diagram of one embodiment of a reboot module that performs a graceful reboot of a network controller.

FIG. 7 is a block diagram of one embodiment of a reboot module 700 that performs a graceful reboot of a network controller. In one embodiment, the reboot module 700 is part of the network controller agent, such as the network controller agent 110 as described in FIG. 1 above. In one embodiment, the reboot module 700 includes reboot recovery module 702, receive state model 704, process state module 706, and resume module 708. In one embodiment, the reboot recovery module 702 receives a signal that the network controller is recovering from a reboot as described in FIG. 4, block 402 above. The receive state module 704 receives the state from the network elements as described in FIG. 4, block 404 above. The process state module 706 processes the network element state information and pushes up states to the network elements as described in FIG. 4, block 406 above. The resume module 708 resumes operation for the network controller as described in FIG. 4, block 408 above.

Figure 8:
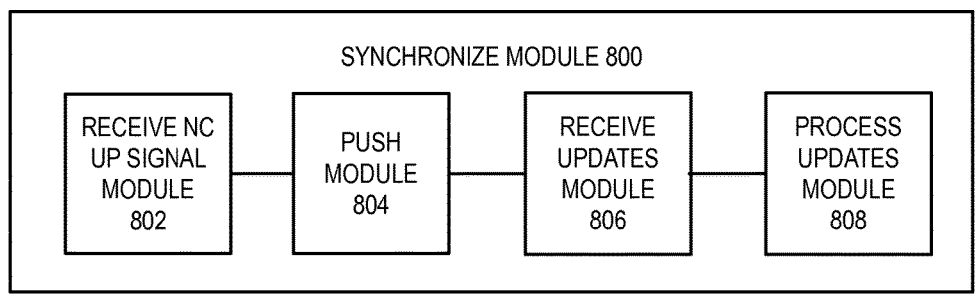
FIG. 8 is a block diagram of one embodiment of a synchronize module that synchronizes a network element database after a network controller reboot.

FIG. 8 is a block diagram of one embodiment of a synchronize module 800 that synchronizes a network element database after a network controller reboot. In one embodiment, the synchronize module 800 is part of a network agent, such as the network element agent 118A-C described in FIG. 1 above. In one embodiment, the synchronize module 800 includes receive network controller up signal module 802, push module 804, receive updates module 806, and process updates module 808. In one embodiment, the receive network controller up signal module 802 receives the signal that the network controller is up as described in FIG. 5, block 502 above. The push module 804 pushes the network element state to the network controller as described in FIG. 5, block 504 above. The receive updates module 806 receives database updates from the network controller as described in FIG. 5, block 506 above. The process updates module 808 processes the updates as described in FIG. 5, block 508 above.

Figure 9:
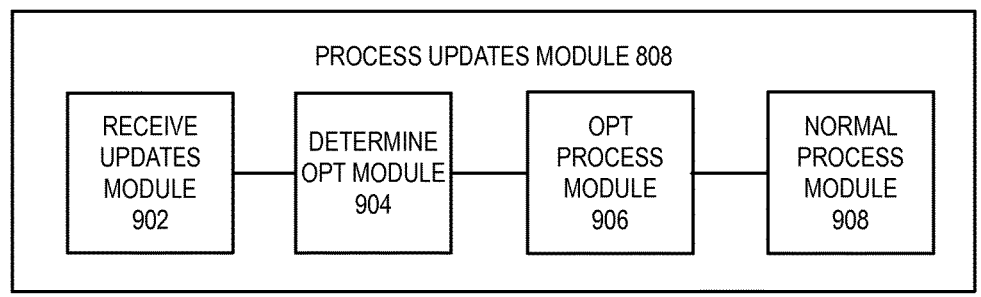
FIG. 9 is a block diagram of one embodiment of a process state module that processes state information pushed to a network element.

FIG. 9 is a block diagram of one embodiment of a process state module that processes state information pushed to a network element. In one embodiment, the process updates module 808 includes receive updates module 902, determine optimization module 904, optimization process module 906, and normal process module 908. In one embodiment, the receive updates module 902 receives the updates to be processed as described in FIG. 6, block 602 above. The determine optimization module 904 determines if this module should perform optimized processing of the updates as described in FIG. 6, block 604 above. The optimization process module 906 performs optimized processing of the updates as described in FIG. 6, block 606 above. The normal process module 908 processes the updates normally as described in FIG. 6, block 608 above.

Figure 10:
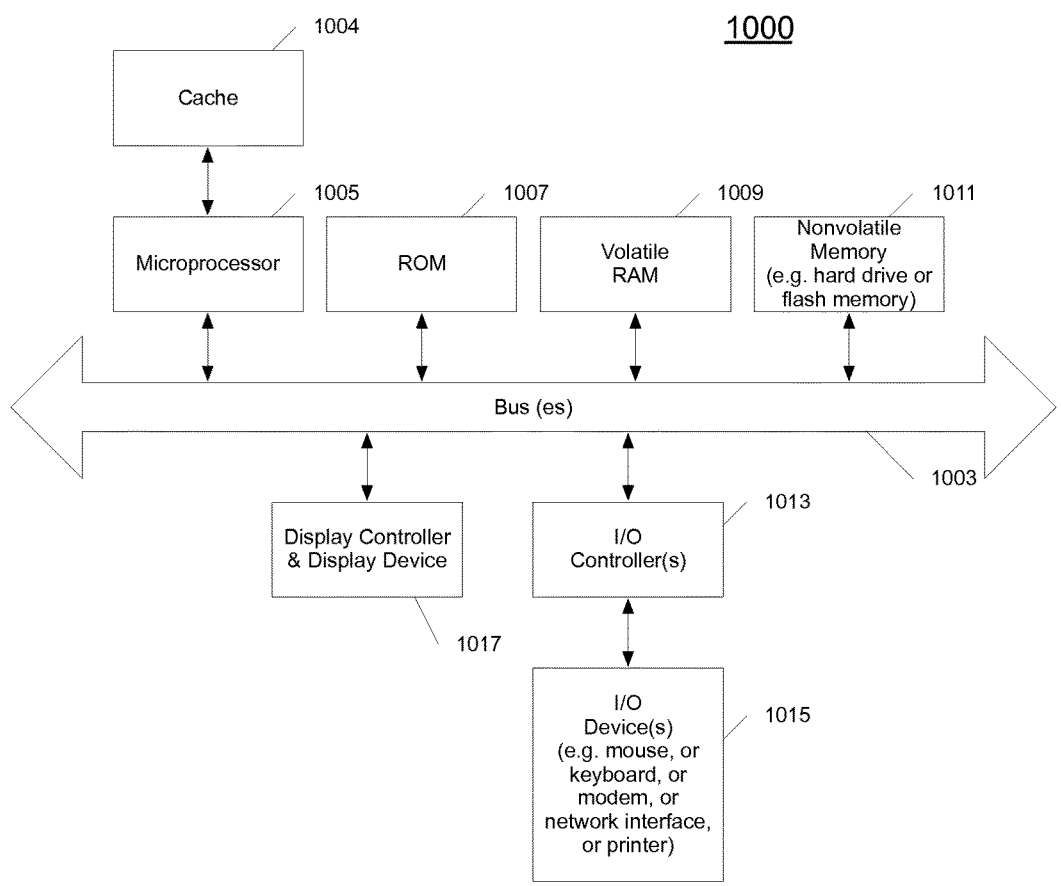
FIG. 10 illustrates one example of a typical computer system, which may be used in conjunction with the embodiments described herein.

FIG. 10 shows one example of a data processing system 1000, which may be used with one embodiment of the present invention. For example, the system 1000 may be implemented including a network controller 102 as shown in FIG. 1. Note that while FIG. 10 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 10, the computer system 1000, which is a form of a data processing system, includes a bus 1003 which is coupled to a microprocessor(s) 1005 and a ROM (Read Only Memory) 1007 and volatile RAM 1009 and a non-volatile memory 1011. The microprocessor 1005 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1017 and to peripheral devices such as input/output (I/O) devices which may be mice, keyboards, modems, network interfaces, printers and other devices which are well known in the art. In one embodiment, the system 1000 includes a plurality of network interfaces of the same or different type (e.g., Ethernet copper interface, Ethernet fiber interfaces, wireless, and/or other types of network interfaces). In this embodiment, the system 1000 can include a forwarding engine to forward network data received on one interface out another interface.

Typically, the input/output devices 1015 are coupled to the system through input/output controllers 1013. The volatile RAM (Random Access Memory) 1009 is typically implemented as dynamic RAM (DRAM), which requires power continually in order to refresh or maintain the data in the memory.

The mass storage 1011 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 1011 will also be a random access memory although this is not required. While FIG. 11 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "performing," "sending," "building," "generating," "sending," "converging," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to bring up a network controller, the method comprising:
   receiving an indication of the network controller booting up, the network controller coupled to a plurality of network elements in a network and maintains a controller database that supports one or more network-wide services used by the plurality of the network elements;
   in response to the receiving of the indication of the network controller booting up, requesting state information from the plurality of network elements;
   receiving the state information from the plurality of network elements;
   building, by the one or more network-wide services, the controller database from the state information; and
   for each of the one or more network-wide services, sending, by the network controller, updates from the controller database to each of a subset of the plurality of network elements at subscribe to the network-wide service, wherein the sending of the updates occurs concurrently with the building of the controller database, each of the plurality of network elements incorporates these updates into a respective network element database, and this network element database is used to perform the network-wide service on the network element.

2. The non-transitory machine-readable medium of claim 1, further comprising:
   converging on the controller database for one of the one or more network-wide services running on the network controller.

3. The non-transitory machine-readable medium of claim 1, wherein the updates are additions to a network element database of each of the subset of the plurality of network elements.

4. The non-transitory machine-readable medium of claim 2, wherein the updates occur after the converging of the controller database.

5. The non-transitory machine-readable medium of claim 1, wherein the network controller is coupled to a software defined network controller.

6. A method to bring up a network controller, the method comprising:
   receiving, by the network controller, an indication of the network controller booting up, the network controller coupled to a plurality of network elements in a network and maintains a controller database that supports one or more network-wide services used by the plurality of the network elements;

in response to the receiving of the indication of the network controller booting up, requesting state information from the plurality of network elements;

receiving the state information from the plurality of network elements;

building, by the one or more network-wide services, the controller database from the state information; and for each of the one or more network-wide services, sending updates from the controller database to each of a subset of the plurality of network elements that subscribe to the network-wide service, wherein the sending of the updates occurs concurrently with the building of the controller database, each of the plurality of network elements incorporates these updates into a respective network element database, and this network element database is used to perform the network-wide service on the network element.

7. The method of claim 6, further comprising:
converging on the controller database for one of the one or more network-wide services running on the network controller.

8. The method of claim 6, wherein the updates are additions to a network element database of each of the subset of the plurality of network elements.

9. The method of claim 7, wherein the updates occur after the converging of the controller database.

10. The method of claim 6, wherein the network controller is coupled to a software defined network controller.

11. A network controller coupled to a plurality of network elements, the network controller comprising:

a processor;
a memory coupled to the processor through a bus; and
a process executed from the memory by the processor that causes the processor to receive an indication of the network controller booting up, the network controller coupled to a plurality of network elements in network and maintains a controller database that supports one or more network-wide services used by the plurality of the network elements, in response to the receiving of the indication of the network controller booting up, request state information from the plurality of network elements; receive the state information from the plurality of network elements, build the controller database from the state information, and for each of the one or more network-wide services, send updates from the controller database to each of a subset of the plurality of network elements that subscribe to the network-wide service, wherein the sending of the updates occurs concurrently with the building of the controller database, each of the plurality of network elements incorporates these updates into a respective network element database, and this network element database is used to perform the network-wide service on the network element.

12. The network controller of claim 11, wherein the process further causes the processor to converge on the controller database for one of the plurality of services running on the network controller.

13. The network controller of claim 11, wherein the updates are additions to a network element database of each of the subset of the plurality of network elements.

14. The network controller of claim 12, wherein the updates occur after the converging of the controller database.

* * * * *